(12) United States Patent
Sato et al.

(10) Patent No.: US 7,408,921 B2
(45) Date of Patent: Aug. 5, 2008

(54) MOBILE TERMINAL APPARATUS

(75) Inventors: Kyoko Sato, Kanagawa (JP); Kaichi Morita, Tokyo (JP); Yusuke Ibata, Kanagawa (JP); Haruo Suzuki, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 663 days.

(21) Appl. No.: 10/492,500

(22) PCT Filed: Jul. 5, 2002

(86) PCT No.: PCT/JP02/06858

§ 371 (c)(1),
(2), (4) Date: Apr. 9, 2004

(87) PCT Pub. No.: WO03/034769

PCT Pub. Date: Apr. 24, 2003

(65) Prior Publication Data

US 2004/0240434 A1    Dec. 2, 2004

(30) Foreign Application Priority Data

Oct. 12, 2001    (JP)    ............................. 2001-315559

(51) Int. Cl.
*H04L 12/66*    (2006.01)
(52) U.S. Cl. .................... 370/352; 370/355; 348/1.02; 348/1.04; 348/1.12; 455/425; 455/552.1; 455/556.1
(58) Field of Classification Search ......... 370/352–360; 455/425, 426.1, 450, 454, 464, 466, 51, 550.1, 455/552.1, 556.1, 557–558; 379/93.25, 93.01, 379/93.08; 348/1.01, 1.02, 1.04
See application file for complete search history.

(56) References Cited

U.S. PATENT DOCUMENTS 6,359,970 B1 *    3/2002    Burgess .................... 379/67.1

(Continued)

FOREIGN PATENT DOCUMENTS

CN    2439150 Y    7/2001

(Continued)

OTHER PUBLICATIONS

European Search Report Dated Oct. 17, 2007.

(Continued)

*Primary Examiner*—Binh K Tieu
(74) *Attorney, Agent, or Firm*—Pearne & Gordon LLP (57) ABSTRACT

There is provided a portable terminal device which is capable of transmitting and receiving data such as an image during a voice call by using a radio communications system allowing parallel access.

The portable access allows parallel access where a voice call by way of a circuit switching system and data communications using a packet communications system are made in parallel. In case an instruction to transmit data to a distant party is issued by way of an operation on the key operation section during a voice call (S16), the directory data is referenced and the mail address of the distant party is retrieved and acquired (step S21). An electronic mail with the photo image data, etc. shot with a camera section attached is automatically generated and transmitted to the distant party by way of packet communications (S23). In case the received electronic mail is from the distant party and image data, etc. is attached, the receiving party opens the data and displays the data on the display section on a priority basis.

3 Claims, 6 Drawing Sheets

U.S. PATENT DOCUMENTS

| | | | |
|---|---|---|---|
| 6,724,869 B2* | 4/2004 | Chapman et al. | 379/93.01 |
| 7,177,665 B2* | 2/2007 | Ishigaki | 455/556.2 |
| 2001/0012051 A1* | 8/2001 | Hara et al. | 348/14.01 |
| 2001/0046886 A1* | 11/2001 | Ishigaki | 455/566 |
| 2003/0026394 A1* | 2/2003 | Chapman et al. | 379/93.01 |
| 2007/0129068 A1* | 6/2007 | Ishigaki | 455/414.1 |

FOREIGN PATENT DOCUMENTS

| | | |
|---|---|---|
| GB | 2311910 | 10/1997 |
| JP | 2000-261574 A | 9/2000 |
| JP | 2001-127899 A | 5/2001 |
| JP | 2001-134507 A | 5/2001 |
| JP | 2001-203819 A | 7/2001 |
| JP | 2001-224063 A | 8/2001 |
| WO | 99-49677 | 9/1999 |
| WO | 01-24555 | 4/2001 |

OTHER PUBLICATIONS

"Phone.com UP.Mail" Internet Citation, Aug. 1999.

* cited by examiner

MOBILE TERMINAL APPARATUS

TECHNICAL FIELD

The present invention relates to a portable terminal device which is capable of communicating data such as photo images as well as voice calls.

BACKGROUND OF THE INVENTION

In recent years, mobile communications apparatus such as a cell phone have become multifunctional. More and more mobile communications apparatus have been in widespread use which incorporate various functions including communications of electronic mails, access to the internet, and download of music or image contents. Recently, cell phones which communicate photo images shot are on the market. The service of the third-generation mobile communications system such as W-CDMA has been launched. With this, a cell phone which communicates moving pictures shot with a built-in camera, a so-called TV telephone function, as well as voice, is already on the market.

In case communications are made using a cell phone with a distant party, acquiring image information as well as the voice of the distant party helps understand the situation of the distant party and his/her surroundings, which serves as an effective communication tool. In case the TV telephone function is used, conversation in the TV telephone mode requires connection over a broadband digital communications circuits for real-time communications of moving pictures right from the start of communications. Cell phones of both parties must be equipped with the TV telephone function. Moreover, a communication fee related to use of digital communications circuits adds to that of a voice call. Thus, a TV telephone function is not yet available casually and at a low cost.

In case a photo image is transmitted from a cell phone incorporating a digital camera, the user must release the ongoing call and take a photograph in the camera mode, or select a photograph previously shot and transmits desired image data to the directory number of the distant party. In this practice, it is not possible to transmit an image during a call. Real-time visual communications, such as a conversation over a photo image just transmitted, are almost impossible.

DISCLOSURE OF THE INVENTION

The present invention has been proposed in view of the aforementioned circumstances and aims at providing a portable terminal device which is readily capable of transmitting or receiving image data during a voice call by using a radio communications system allowing parallel access.

The invention provides a portable terminal device comprising: a radio communications section which allows parallel access where radio communications by a plurality of radio communications means are made in parallel; communications data generation means for automatically generating communications data to a distant party including transmit data in case a data transmission instruction is made during a voice call by way of predetermined communications means; and data transmission means for transmitting the generated communications data to the distant party by way of other communications means.

Preferably, the communications data generation means automatically generates an electronic mail destined for the distant party with the transmit data attached as the communications data.

Preferably, the communications data generation means acquires a corresponding mail address from the directory number of the distant party by using directory data where directory numbers and corresponding mail addresses are registered, and automatically generates an electronic mail including the transmit data destined for the mail address.

Preferably, the data transmission means transmits communications data including the transmit data via packet communications as the other communications means during a voice call by way of the predetermined communications means.

Preferably, the communications data generation means and the data transmission means use, as the transmit data, at least one of the image data of a photo shot with a camera section, image data stored in storage means or image data input from external apparatus to generate the communications data and transmit the communications data to the distant party.

The invention provides a portable terminal device comprising: a radio communications section which allows parallel access where radio communications by a plurality of radio communications means are made in parallel; data reception means for receiving communications data transmitted by other communications means during a voice call by way of predetermined communications means; sender determination means for determining the sender of the received communications data; and data display means for automatically displaying transmit data included in the communications data in case the sender is the distant party.

Preferably, in case an electronic mail is received as communications data by the data reception means, the sender determination means acquires a corresponding directory number from the sender mail address of the electronic mail by using directory data where directory numbers and corresponding mail addresses are registered, and determines whether the destination of the electronic mail is the distant party based on the determination on matching between this directory number and the directory number of the distant party.

Preferably, in case an electronic mail from the distant party is received as communications data by the data reception means, the data display means automatically displays on a priority basis the transmit data attached to the electronic mail.

Preferably, the data reception means receives communications data including the transmit data by way of packet communications as the other communications means during a voice call by way of the predetermined communications means.

Preferably, the data reception means receives communications data including image data as the transmit data and the data display means displays the image data.

In the invention, in case an instruction for sending transmit data such as image data to the distant party is made during a voice call by way of a circuit switching system, communications data such as an electronic mail destined for the distant party with that transmit data attached is automatically generated, and the communications data is transmitted to the distant party by way of other communications means such as a packet communications system. The receiving party receives communications data such as an electronic mail transmitted by way of packet communications, etc. during a voice call, determines the sender of the received communications data, and automatically displays the transmit data such as image data included in the communications data in case the sender is the distant party.

With this configuration, it is possible to readily transmit or receive data such as an image during a voice call, thereby allowing communications using a large amount of information.

In the figures, a numeral 13 represents a radio communications section, 14 a key operation section, 14a a camera key, 14b a display controller, 15 a camera section, 16 a central controller, 17 a display section, 18 a display controller, 19 a data memory, 20 an input/output interface, 21 a loudspeaker, 22 a receiver, 23 a microphone, 25 an imaging section, 26 an image memory, 27 a camera controller, 30 an enclosure, 31 and 32 terminals, 35 image data, 41 a transmission controller, 42 an image acquisition section, 43 a mail generator, 44 an image transmitter, 51 a reception controller, 52 an image receiver, 53 a sender determination section, and 54 an image display section.

BEST MODE FOR CARRYING OUT THE INVENTION

An embodiment of the invention will be described referring to the drawings.

Figure 1:
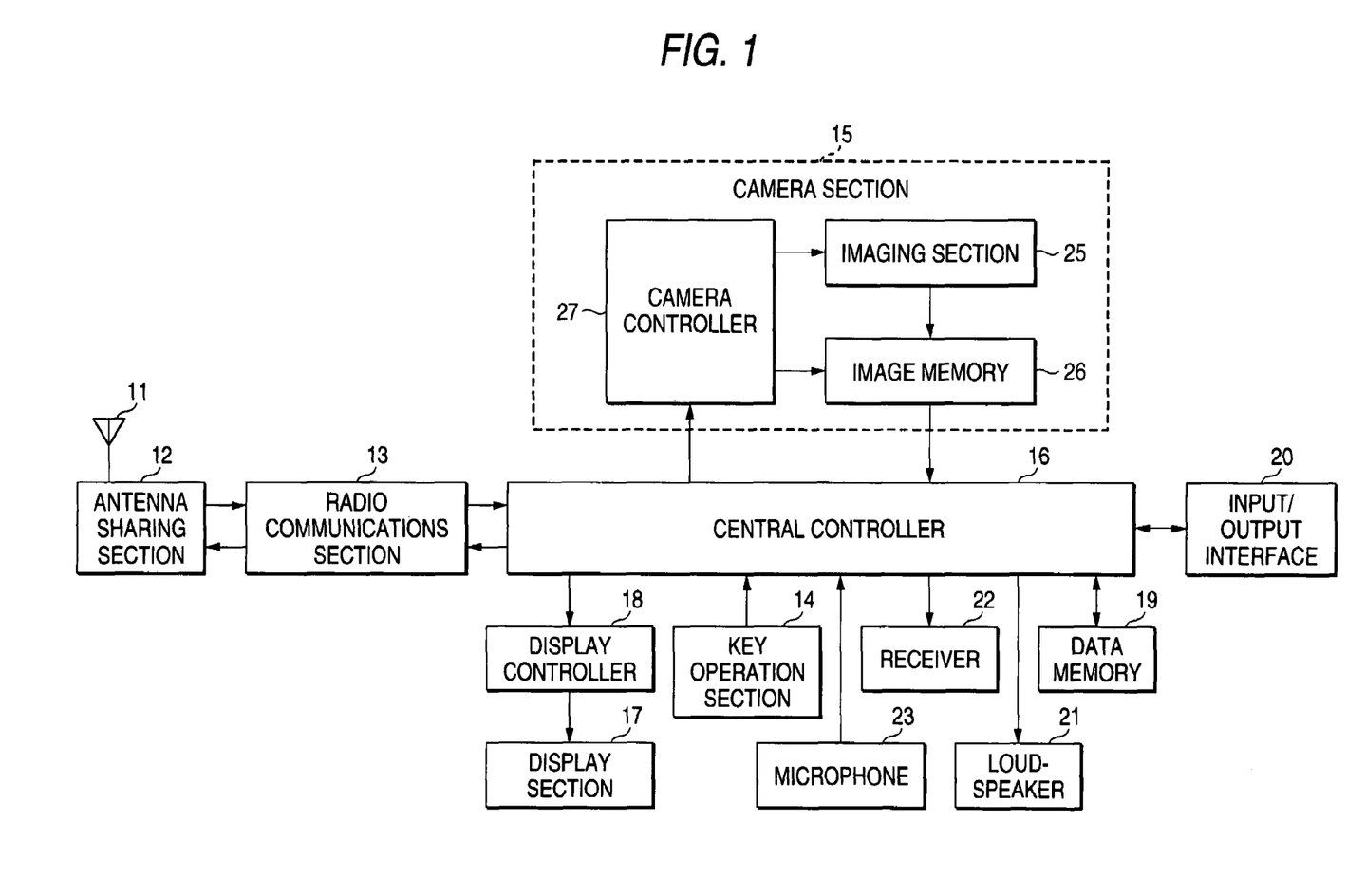
FIG. 1 is a perspective view showing the configuration of a portable terminal device according to an embodiment of the invention.
Figure 2:
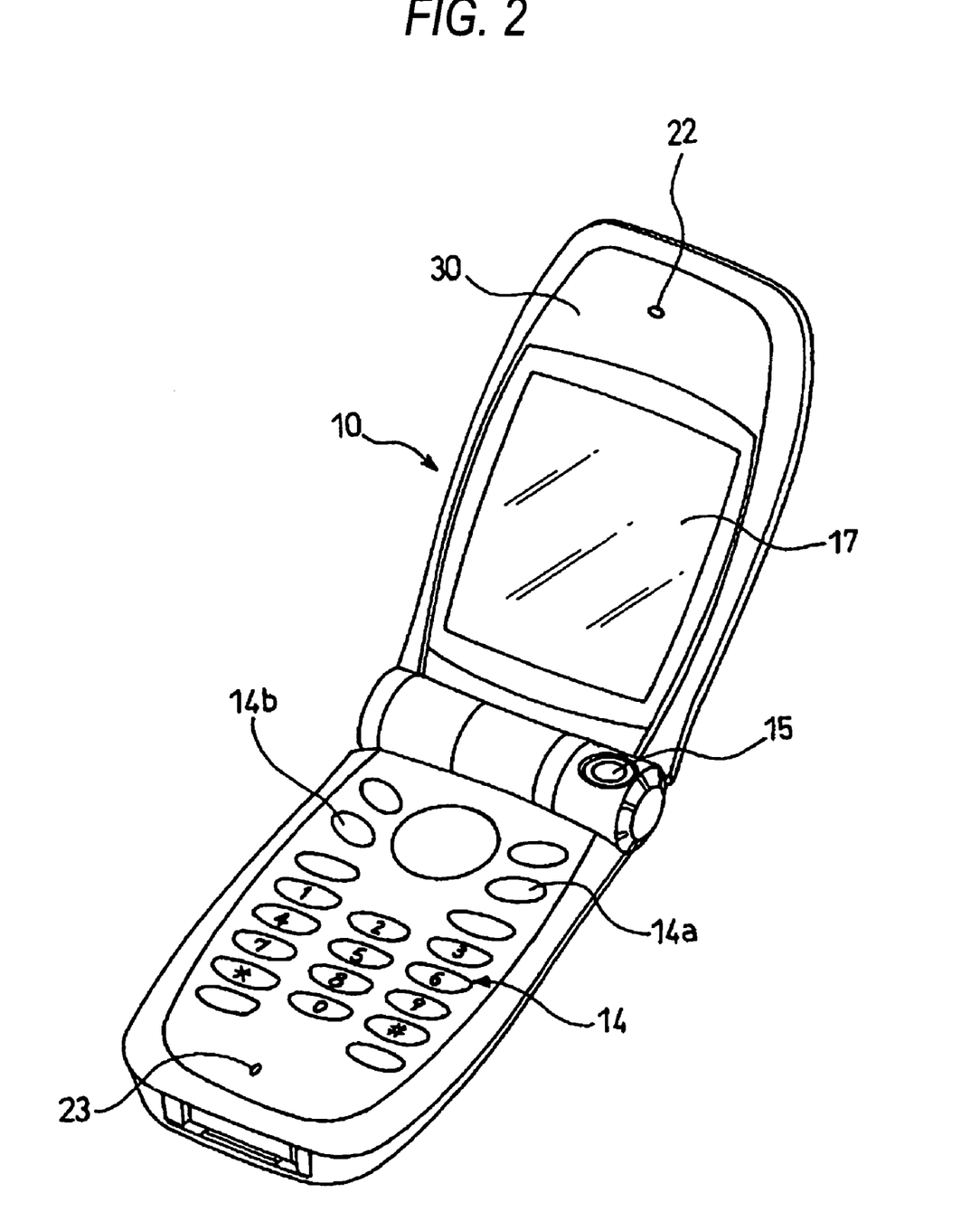
FIG. 2 is a perspective view showing the external appearance of a portable terminal device according to this embodiment.

FIG. 1 is a perspective view showing the configuration of a portable terminal device according to an embodiment of the invention. FIG. 2 is a perspective view showing the external appearance of a portable terminal device according to this embodiment. This embodiment shows an example of configuration where the invention is applied to a cell phone equipped with a camera section as an example of a portable terminal device. The invention may be applied to a portable terminal device of another form such as a Personal Digital Assistant (PDA) as long as the portable terminal device is equipped with a function to communicate data such as an image as well as a voice call function.

As shown in FIG. 1, a cell phone 10 according to this embodiment comprises an antenna 11, an antenna sharing section 12, a radio communications section 13, a key operation section 14, a camera section 15, a central controller 16, a display section 17, a display controller 18, a data memory 19, an input/output interface 20, a loudspeaker 21, a receiver 22, and a microphone 23.

The antenna sharing section 12 comprises a filter for transmission and a filter for reception (either not shown) and allows simultaneous transmission and reception by using the single antenna 11. The radio communications section 13 modulates a transmit signal by using a predetermined modulation system to generate a radio signal for transmission as well as demodulates a received radio signal to obtain a receive signal and comprises a radio communications circuit for transmission/reception. The key operation section 14 comprises a plurality of keys for operating the cell phone and generates a key code corresponding to a key operation and outputs the key code to the central controller 16.

The camera section 15 shoots a subject in proximity of the cell phone and obtains the image data such as a still photo image. The camera section 15 comprises an imaging section 25 including a solid-state imaging device such as a CMOS imaging device and an imaging optical system, an image memory 26 for storing data of an image shot with the imaging section 25, and a camera controller 27 for controlling the imaging section 15 and the image memory 26 in accordance with an instruction from the central controller 16. The cell phone 10 may be a so-called TV telephone set which shoots a moving picture on the camera section 15 and communicates the moving picture.

The display section 17 comprises a display device such as an LCD (Liquid Crystal Display). The display section 17 is used to display various data related to operation of a cell phone such as the directory numbers of senders and receivers, mail messages, data such as a photo image shot with the camera section 15, a clock and/or a calendar, a directory, and a call origination/termination history. The display controller 18 controls provision of display data input from the central controller 16 on the display section 17.

The data memory 19 is storage means for storing data such as electronic mail data and image data together with directory data where directory numbers and corresponding mail addresses are registered and comprises a flash memory, etc. The input/output interface 20 performs input and output of data from/to external apparatus. For example, the input/output interface 20 can input image data from an externally connected digital camera. The input/output interface 20 may be a radio communications interface conforming to Bluetooth for example, or a serial or parallel wired communications interface. The input/output interface 20 may be a detachable memory card. Such a memory card may be attached to the main unit of a cell phone and the data from the memory card is available.

The loudspeaker 21 is used to output a ringing tone, the voice of the distant party, and an announcement tone in the use of the cell phone 10. The receiver 22 is used to output voice of the distant party. The microphone 23 is used to input the voice of the user of the cell phone 10.

The central controller 16 controls each section of the cell phone in accordance with a predetermined program. In particular, the central controller 16 controls operation in transmitting or receiving image data as transmit data concerning the image transmission function during a call as a major function in this embodiment.

As shown in FIG. 2, the enclosure 30 of the cell phone 10 comprises a receiver 22, a display section 17, a camera section 15, a key operation section 14, and a microphone 23. The key operation section 14 comprises various function keys as well as a ten-key pad for entering a directory number and characters. The key operation section 14 comprises a camera key 14a which activates the camera section 15 and serves as a shutter key for shooting, and an image transmission key 14b which transmits image data. The camera key 14a and the image transmission key 14b may be dedicated single-function keys or may be keys to which multiple functions including other function are assigned, or may perform functions displayed near the keys, such as at the bottom of the display section 17 in a predetermined state.

The cell phone 10 of this embodiment is arranged to simultaneously perform radio communications by way of a plurality of communications means on the radio communications section 13. For example, by way of a third-generation mobile communications system such as W-CDMA, the cell phone 10 allows a parallel access where data communications using a packet communications system are made in parallel with a voice call or data communications by way of a circuit switching system. The invention may be also applied to a configuration where a parallel access is made by way of communication means of other systems or a combination of other communications means.

As well as the aforementioned configurations, the function of the characteristics of the embodiment mentioned later is applicable to a cell phone 10 where the camera section 15 is separately provided from the enclosure of the cell phone 10, and a cell phone 10 not equipped with a camera section 15 which is capable of transmitting image data, etc. input via the input/output interface 20, or which is capable of displaying received image data.

Figure 3:
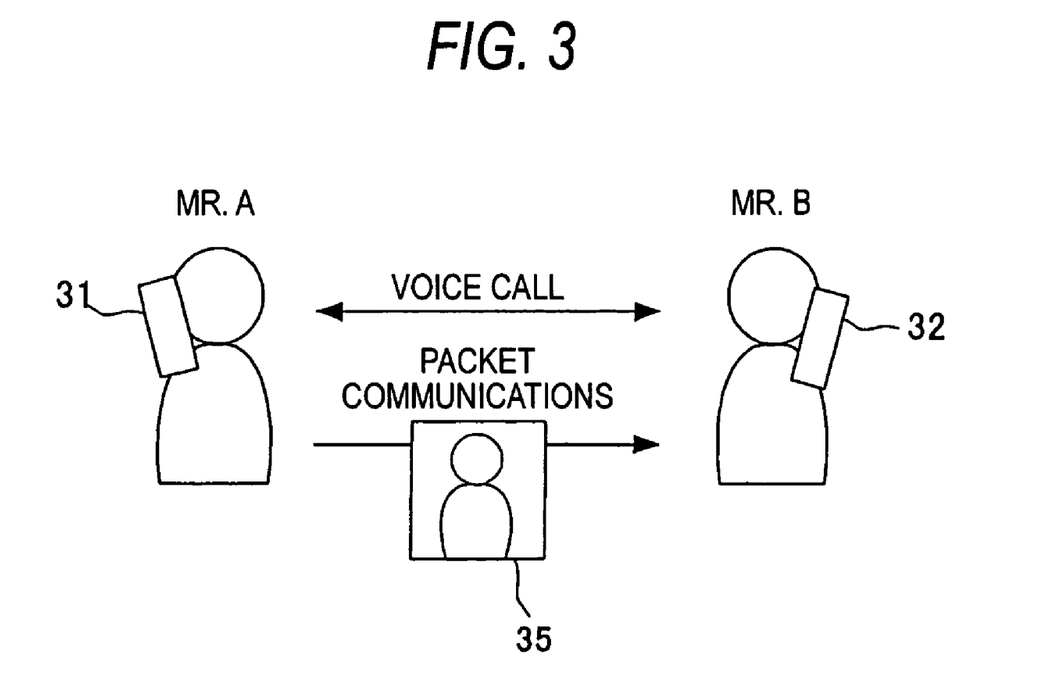
FIG. 3 illustrates the image transmission operation in this embodiment.

Image transmission operation of the cell phone 10 of the embodiment will be described. As shown in FIG. 3, in this embodiment, in case the image data 35 such as a photo image shot with a camera is communicated as transmit data by way of other communications means between the cell phone terminals 31, 32 engaged in a voice call by way of one communications means, an electronic mail with the image data 35 attached is automatically generated as communications data including the transmit data, and the electronic mail is transmitted to the distant party by way of packet communications as other communications means, in parallel with the voice call. In this example, operation of transmitting a photo image from Mr. A to Mr. B while Mr. A (calling party) and Mr. B (called party) are engaged in a call over cell phones will be described focusing on the processing of the central controller 16.

Figure 4:
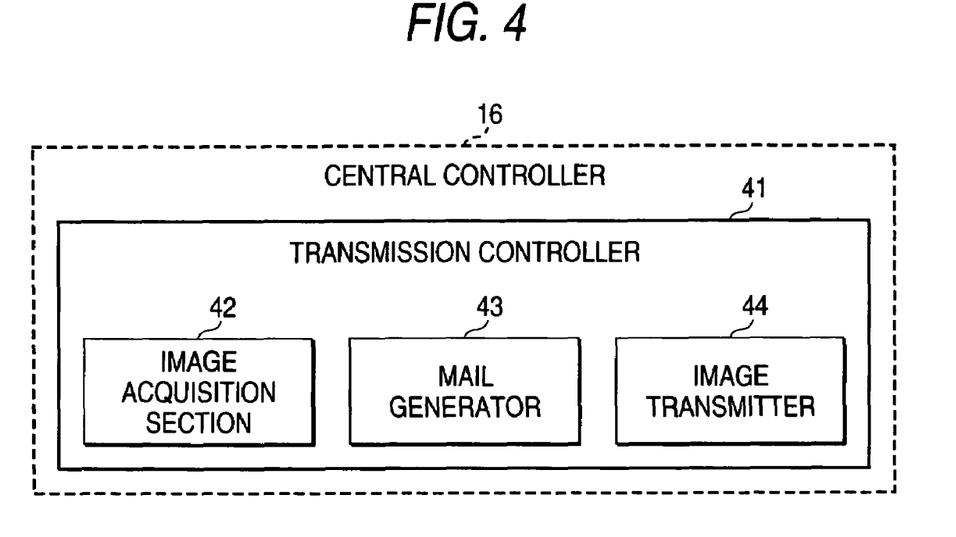
FIG. 4 is a block diagram showing the functional configuration of a transmission controller.
Figure 5:
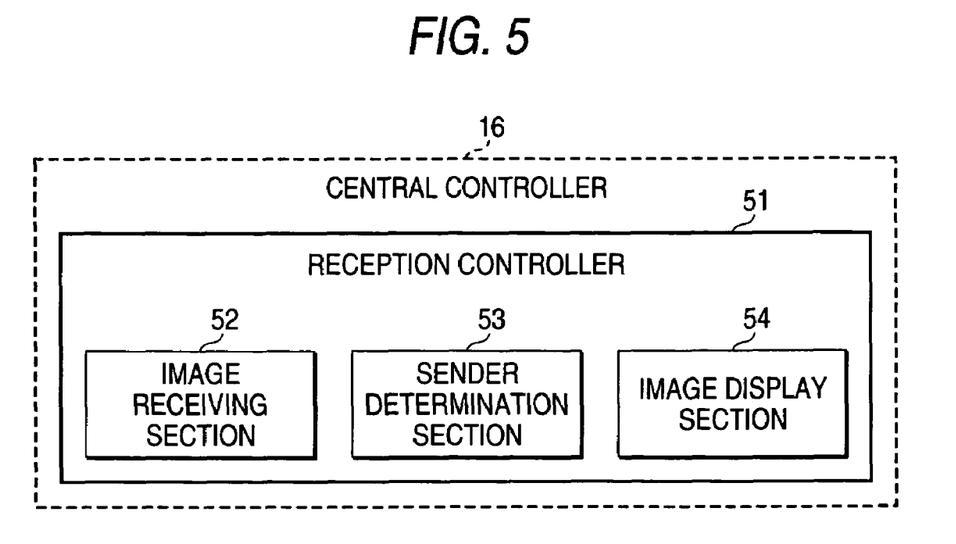
FIG. 5 is a flowchart showing the operation procedure of the image sending party.

FIG. 4 is a block diagram showing the functional configuration of a transmission controller. FIG. 5 is a flowchart showing the operation procedure of the image sending party.

The central controller 16 comprises, as the functions of the transmission controller 41 for performing transmission control in data communications during a voice call, an image acquisition section 42 for acquiring image data for transmission by selecting data of an image shot with the camera section 15 or stored in the data memory 19 or through data input from the input/output interface 20, a mail generator (communications data generation means) 43 for automatically generating an electronic mail as communications data to the distant party including image data for transmission, and an image transmitter (data transmission means) 44 for transmitting an electronic mail with image data generated by way of packet communications to the distant party.

On the sending side (terminal of Mr. A as a calling party in this case), while a voice call is in progress with the terminal of Mr. B (step S11), when the user presses a predetermined key such as a photo transmission start key, the terminal of Mr. A is placed in the state ready to transmit a photo to Mr. B as the distant party (step S12). Execution branches depending on whether to perform shooting of an image for transmission (step S13). The user presses the camera key 14a when wishing to perform shooting. When the camera key 14a is pressed by the user to take a photograph, the camera section 15 is activated to allow shooting (step S14). In case the camera section is equipped with a cover and opening/closing of the cover turns on/off the camera section 15a, it is possible to activate the camera section by opening the cover.

When the camera key 14a or shutter key is pressed in this state, a subject is imaged in the imaging section 25 of the camera section 15 and shooting is made (step S15). The image data is temporarily stored in the image memory 26 and the photo image shot is displayed on the display section 17. Execution branches depending on whether the image transmission key 14b is pressed, that is, whether an instruction to transmit the photo image shot is issued (step S16). The user checks the photo image displayed on the display section 17 to determine whether to transmit the photo image to the distant party and performs key operation accordingly. When wishing to transmit the photo image, the user presses the image transmission key 14b.

In case a re-shooting key is pressed to issue an instruction to take a photograph again, execution returns to step S15 to place the camera section 15 in the shooting enable state. In case a cancel key is pressed to issue an instruction to cancel image transmission, the image transmission operation is canceled and execution returns to step S11. In case the image transmission key 14b is pressed, image data obtained through shooting is temporarily stored into the data memory 19 as image data for transmission (step S17).

When transmitting an image using image data stored without performing shooting, the use presses an image selection key. When the image selection key is pressed by the user in step S13, image data of photographs stored in the data memory 19 is displayed in a list, etc., to allow selection of a photograph (step S18). After a photo image to transmit is selected by the operation of the user, execution branches depending on whether there is an instruction to transmit the photo image (step S19). In case the cancel key is pressed to issue an instruction to cancel image transmission, the image transmission operation is canceled and execution returns to step S11. In case the image transmission key 14b is pressed, image data selected is temporarily stored into the data memory 19 as image data for transmission (step S17).

The image transmission state is entered and automatic generation of an electronic mail for image transmission is started (step S20). In the automatic generation of an electronic mail, the directory data is referenced and the mail address of Mr. B as the distant party is retrieved based on the called number (directory number of the destination) (step S21). Whether the mail address of the distant party is registered is determined (step S22). In case the mail address is registered in the directory, the mail address registered is assumed as a destination and an electronic mail with the image data for transmission stored in the data memory 19 attached is automatically generated and transmitted (step S23). In this case, the image data is transmitted by way of packet communications as communications means other than voice communications. In case the sending terminal is a called party, for example in case image data is transmitted from the terminal of Mr. B as a called party from the terminal of Mr. A as a calling party, the mail address in the directory data is retrieved based on the originating number (directory number of the calling party).

In case the nail address of the distant party is not registered, the cell phone is placed in a mail address input state (step S24). When a mail address is entered by the user, an electronic mail with the image data for transmission stored in the data memory 19 attached is automatically generated and transmitted (step S23).

The image data transmitted is displayed on the display section 17 (step s25) and voice communication is continued from the beginning of the procedure. In this way, the user has only to issue an instruction to transmit an image by pressing the image transmission key 14b to readily transmit to the distant party, with a simple operation, a shot photo image while a voice call is under way. The user can check the transmitted photo image by watching the display section 17.

It is possible to transmit various data such as other image data and directory data as well as photo image data shot with the camera section to the distant party during a voice call. In this case, the target transmit data is stored into the memory 19 in advance. The photo image data may be image data shot with an external camera or stored in external apparatus which is input via the input/output interface 20. The external camera or external apparatus is conveniently used when connected to the cell phone via a radio communications interface conforming to Bluetooth.

The mail address of the destination of the image data s not limited to the mail address set to the cell phone of the distant party but may be a mail address set to a Personal Computer (PC) or a Personal Digital Assistant (PDA) which is used by the distant party during a voice all or which is located in the proximity of the distant party. The user may transmit an electronic mail with image data attached to the mail address of the terminal.

Data format of the communications data transmitted to the distant party is not limited to the format of a general electronic mail communicated over networks such as the internet. It is possible to use a short message service provided by a mobile communications service to specify the telephone number of the distant party and transmit various data such as photo image data in message format, mail format, or other formats. In this case, it is possible to automatically generate a message data with ease by using the directory number of the distant party.

In the image transmission operation, determination of the voice call state may be made at the beginning of the procedure as shown in FIG. 5, activation of the camera in step S14, selection of a photo in step S18, or instruction to transmit the image in steps S16 and S19.

Figure 6:
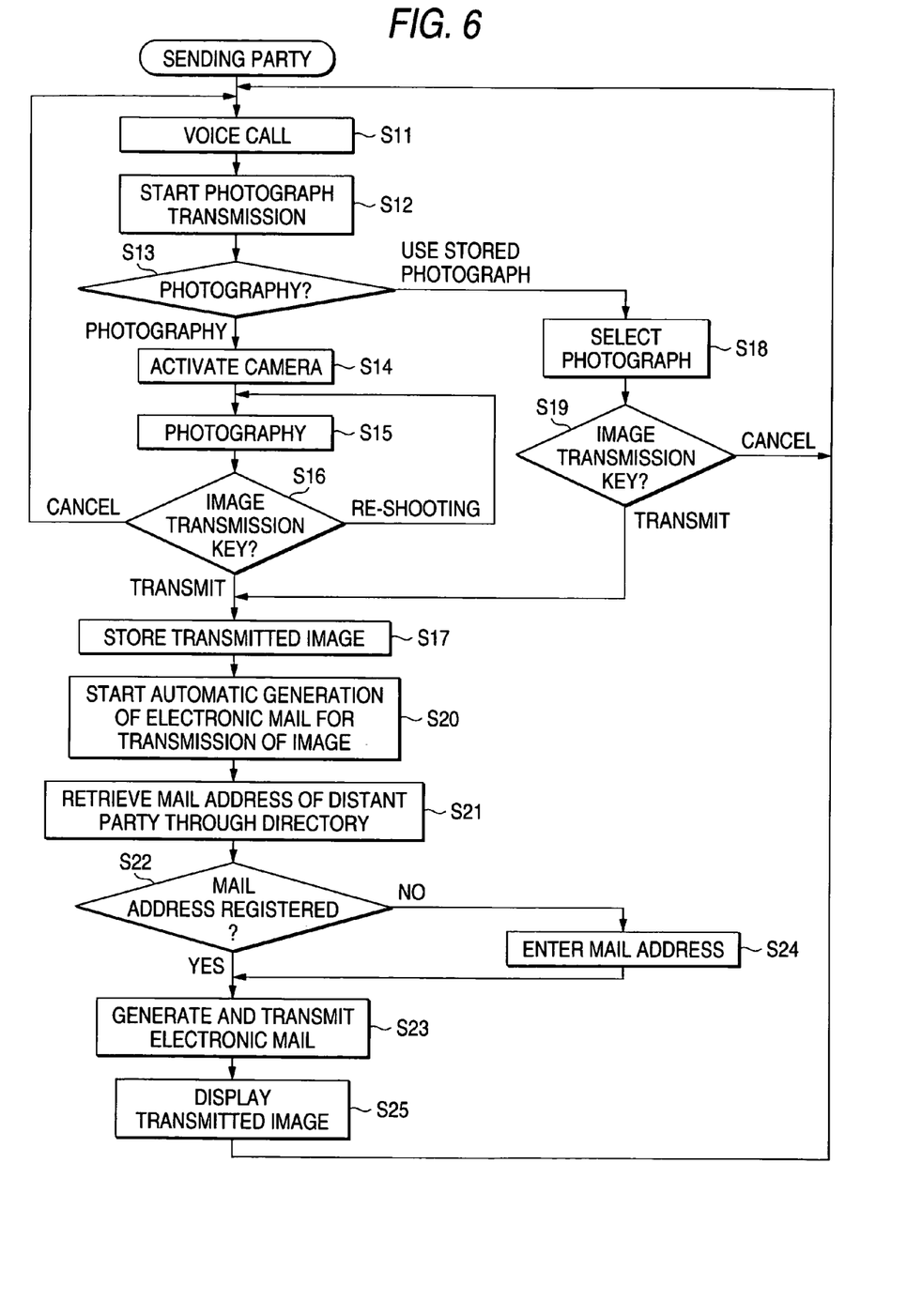
FIG. 6 is a block diagram showing the functional configuration of a reception controller.
Figure 7:
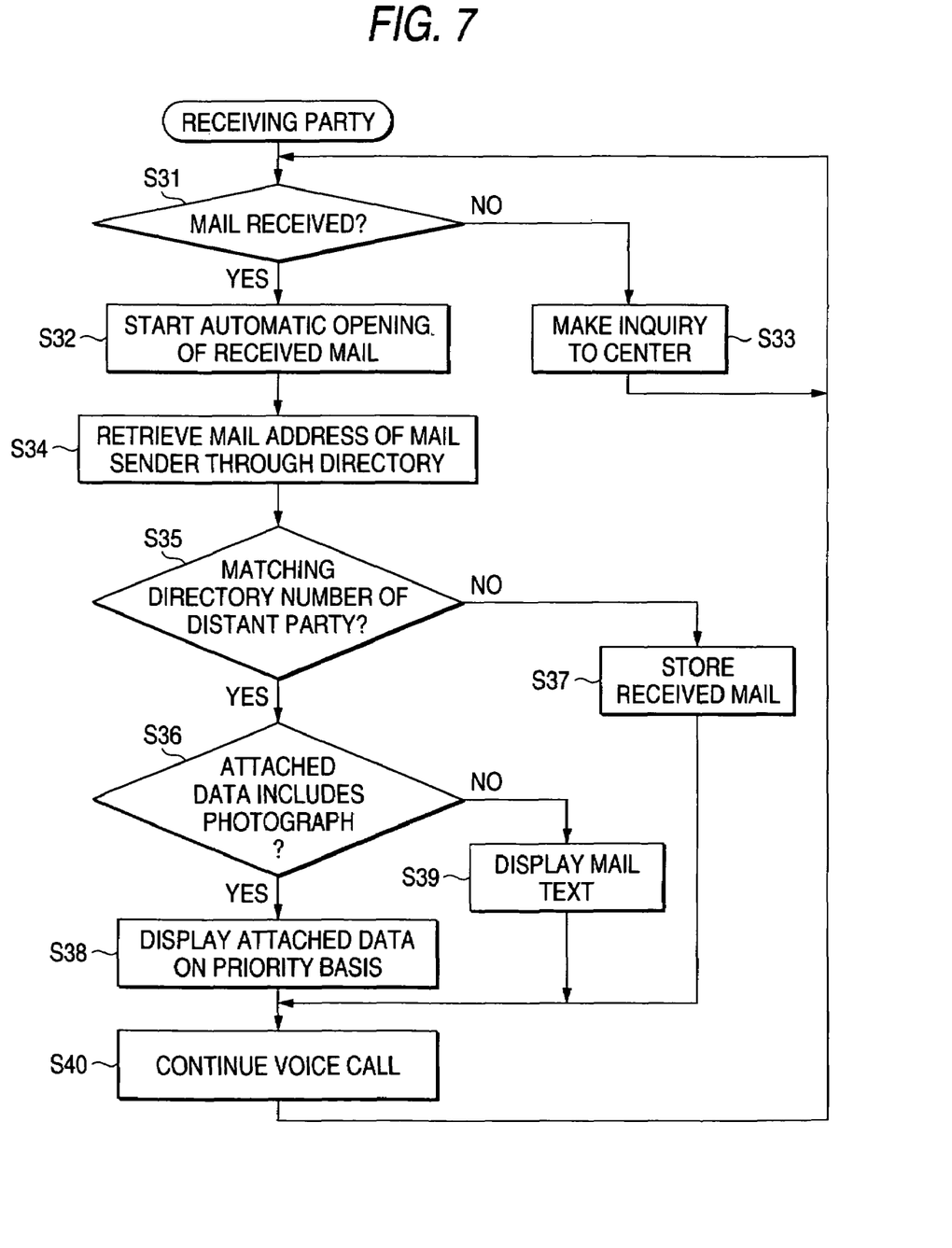
FIG. 7 is a flowchart showing the operation procedure of the image receiving party.

FIG. 6 is a block diagram showing the functional configuration of a reception controller. FIG. 7 is a flowchart showing the operation procedure of the image receiving party.

The central controller 16 comprises, as the functions of the reception controller 51 for performing reception control in data communications during a voice call, an image receiving section (data reception means) 52 for receiving an electronic mail with image data attached which is transmitted by way of packet communications, a sender determination section (sender determination means) 53 for determining whether the sender of the received electronic mail is the distant party, and an image display section (data display means) 54 for opening the image data attached to the electronic mail transmitted from the distant party in case the sender of the received electronic mail is the distant party and automatically displaying the image data.

On the receiving side (terminal of Mr. B as a called party in this case), while a voice call is in progress with the terminal of Mr. A (step S11), it is determined whether an electronic mail is received (step S31) and, in case one is received during a voice call, the subsequent step of automatically opening the received mail is executed (step S32). Otherwise, an inquiry is made to the center of a mobile communications system about a received mail by way of the user's operation (step S33) In case an electronic mail is delivered to the user, the user downloads the received mail.

In the step of automatically opening the received mail, the directory data is referenced and the directory number of the receiver of the mail is retrieved from mail address data (step S34). It is determined whether the directory number of the mail sender matches the directory number of Mr. A as the distant party (step S35). In case it is determined that both directory numbers match each other and the received mail is from the distant party, it is determined whether photo image data is attached to the received electronic mail (step S36). In case the directory number of the mail sender does not match the directory number of the distant party, the received mail is stored into the data memory 19 (step S37). At a later time, the user may arbitrarily open the stored electronic mail and display the mail on the display section for browsing.

In case the received mail is from the distant party and photo image data is attached to the electronic mail, the attached data is opened and displayed on the display section 17 on a priority basis (step S38). In case photo image data is not attached to the electronic mail, the mail text is opened and displayed on the display section 17 (step S39). When the step of automatically opening the received mail is complete, the voice call state is continued (step S40).

By way of the above procedure, Mr. A as a sender of the image data and Mr. B as a receiver of the image data can tale with each other while watching the screen where the same image data is displayed.

To communicate image data or check the image data on the screen while engaged in a voice call, a configuration is to be provided where the output of the received voice is readily switched from the receiver 22 to the loudspeaker 21 so that the user may talk with his/her head off the enclosure 30 of the cell phone 10, a so-called hands-free operation.

As mentioned earlier, according to this embodiment, it is possible to transmit to a distant party the data of a photo image shot with a camera section during a voice call by using a radio communications system allowing parallel access, especially a third-generation mobile communications system such as W-CDMA. By automating the data transmission by way of an electronic mail to the distant party during the voice call, it is possible to readily communicate data such as a photo while engaged in a call. This provides simple and low-cost real-time visual communications on top of voice communications, without using the TV telephone function. The invention may be applied to a general system such as a radio communications system allowing parallel access or an electronic mail, so that introduction of the invention is made easy.

While the invention has been described in detail and in terms of specific embodiments, those skilled in the art will recognize that various changes and modifications can be made in it without departing from the spirit and scope thereof.

This patent application is based on the Japanese Patent Application No. 2001-315559 filed Oct. 12, 2001, the disclosure of which is incorporated herein by reference.

INDUSTRIAL APPLICABILITY

A mentioned hereinabove, the invention has an advantage of providing a portable terminal device which is capable of transmitting and receiving data such as an image during a voice call by using a radio communications system allowing parallel access, especially a third-generation mobile communications system such as W-CDMA.

The invention claimed is:
1. A portable terminal device comprising:
a radio communications section which allows parallel access where radio communications by a plurality of radio communications means are made in parallel;
a data reception section which receives communications data transmitted by other communications means during a voice call with a distant party by way of predetermined communications means;
a sender determination section which determines the sender of said received communications data; and
a data display section which automatically displays transmit data included in said communications data in case said sender is the distant party,
wherein, in case an electronic mail is received as communications data by said data reception section, said sender determination section acquires a corresponding direc- tory number from the sender mail address of said electronic mail by using directory data where directory numbers and corresponding mail addresses are registered, and determines whether the sender of said electronic mail is the distant party based on the determination on matching between this directory number and the directory number of the distant party.

2. A portable terminal device comprising:

a radio communications section which allows parallel access where radio communications by a plurality of radio communications means are made in parallel;

a data reception section which receives communications data transmitted by other communications means during a voice call with a distant party by way of predetermined communications means;

a sender determination section which determines the sender of said received communications data; and a data display section which automatically displays content data included in said communications data in case said sender is the distant party, wherein, in case an electronic mail is received as communications data by said data reception section, said sender determination section determines the sender of said received communications data by automatically opening the received mail.

3. A portable terminal device comprising:

a radio communications section which allows parallel access where radio communications by a plurality of radio communications means are made in parallel;

a data reception section which receives communications data transmitted by other communications means during a voice call with a distant party by way of predetermined communications means;

a sender determination section which determines the sender of said received communications data; and a data display section which automatically displays content data included in said communications data in case said sender is the distant party, wherein, in case an electronic mail is not received as communications data by said data reception section, said sender determination section determines the sender of said received communications data by making an inquiry to the center of a mobile communications system about a received mail and downloading the received mail.

* * * * *